US012290947B2

(12) United States Patent
Wong

(10) Patent No.: US 12,290,947 B2
(45) Date of Patent: May 6, 2025

(54) BEARD TRIMMER

(71) Applicant: Raymond Industrial Ltd., Sha Tin (HK)

(72) Inventor: John Ying Man Wong, Sha Tin (HK)

(73) Assignee: Raymond Industrial Ltd., Hong Kong (CN)

( * ) Notice: Subject to any disclaimer, the term of this patent is extended or adjusted under 35 U.S.C. 154(b) by 166 days.

(21) Appl. No.: 17/891,801

(22) Filed: Aug. 19, 2022

(65) Prior Publication Data

US 2024/0058975 A1 Feb. 22, 2024

(51) Int. Cl.

*B26B 19/20* (2006.01)
*B26B 19/28* (2006.01)
*B26B 19/38* (2006.01)
*B26B 19/04* (2006.01)

(52) U.S. Cl.

CPC .............. *B26B 19/20* (2013.01); *B26B 19/28* (2013.01); *B26B 19/3866* (2013.01); *B26B 19/3886* (2013.01); *B26B 19/04* (2013.01)

(58) Field of Classification Search

CPC . B26B 19/20; B26B 19/3886; B26B 19/3866; B26B 19/28; B26B 19/04; B26B 19/205; B26B 19/12; B26B 19/3813; B26B 19/06; B26B 19/3853

USPC ..... 30/201, 202, 233.5, 216, 233, 196, 43.1, 30/293, 74, 220, 200, 49, 55, 131, 132, 30/133, 241

See application file for complete search history.

(56) References Cited

U.S. PATENT DOCUMENTS 4,845,852 A * 7/1989 Sukow .................... B26B 19/20 30/201
2006/0053628 A1* 3/2006 Obermann .............. B26B 19/44 30/30
2008/0178468 A1* 7/2008 Liao .................... B26B 19/3886 30/34.05
2009/0188117 A1* 7/2009 Putzer ................. B26B 19/3813 30/201
2012/0272532 A1* 11/2012 Sobagaki ................ B26B 19/20 30/201

(Continued)

FOREIGN PATENT DOCUMENTS

CN 109500843 A * 3/2019 ............. B26B 19/20
CN 212736083 U * 3/2021 ............. B26B 19/20

(Continued)

*Primary Examiner* — Ghassem Alie

(74) *Attorney, Agent, or Firm* — von Briesen & Roper, s.c.

(57) ABSTRACT

A comb adjustment assembly for a beard trimmer includes a guide collar, a first adjusting connector, and an adjustor handle threadably coupled to the first adjusting connector. The first adjusting connector includes an extension arm, a connector coupled to the extension arm and configured to connect with an external structure. A guide collar aperture is formed in the guide collar, and the extension arm penetrates through the guide collar aperture. When the guide collar is in a fixed state, the adjustor handle is rotated, and the extension arm moves through the guide collar aperture. After the comb adjustment assembly is coupled to the beard trimmer in the present disclosure, the height of the comb unit may be regulated, and a user can adjust the hair cutting length by accurately regulating the extending length of the comb unit.

14 Claims, 14 Drawing Sheets

(56) References Cited

U.S. PATENT DOCUMENTS

2013/0239416 A1* 9/2013 Wevers .................. B26B 19/20
30/201
2013/0263457 A1* 10/2013 Sobagaki ............. B26B 19/205
30/201
2014/0331503 A1* 11/2014 Uit De Bulten ...... B26B 19/205
30/201

FOREIGN PATENT DOCUMENTS

CN 214520332 U * 10/2021 ............. B26B 19/20
DE 4317530 A1 * 12/1993 ........... B26B 19/205

* cited by examiner

BEARD TRIMMER

TECHNICAL FIELD

The present disclosure relates to methods and apparatus for cutting body hair and, more particularly to beard trimming apparatus and methods.

BACKGROUND

A beard trimmer is widely used in hairdressing and haircut industries. However, as a device equipped for such applications, a comb unit is may permit a user to control the length of trimmed hair, as well as to neatly trim hair. Beard trimmers are known that are equipped with a plurality of comb units with different specifications, so the user can select the comb unit with the suitable specification. This approach, however, does not permit stepless regulation for the limiting length of each comb unit. Furthermore, this approach requires a plurality of separate, interchangeable comb units, which are easy to lose.

SUMMARY OF THE DISCLOSURE

Based on this, it is necessary to provide a comb adjustment assembly capable of regulating the height of combs and a beard trimmer.

In order to solve the above technical problem, the present disclosure provides a beard trimmer, comprising a beard trimmer body, a cutting assembly, a comb, and a comb adjustment assembly. The comb adjustment assembly and the cutting assembly are coupled to the beard trimmer body, the combs match with the cutting assembly, and the comb adjustment assembly is operably coupled to the combs to move the combs relative to the cutting assembly and control a distance between the combs and the cutting assembly. The comb adjustment assembly comprising a first adjusting connector and an adjustor handle, the adjustor handle being in transmission connection with the first adjusting connector, and the first adjusting connector is in transmission connection with the comb. When rotating, the adjustor handle drives the first adjusting connector to translate along an axial direction of the adjustor handle, and the first adjusting connector drives the comb to move in relative to the cutting assembly.

In some embodiments, the beard trimmer body comprises a motor and a motor frame. The motor is fixed on the motor frame, and the cutting assembly and the comb are located at one end, away from the adjustor handle, of the motor frame. The motor is operably coupled to the cutting assembly to drive the cutting assembly for cutting. The beard trimmer body further comprises a battery and a control circuit board, the battery is electrically connected to the control circuit board, the battery and the control circuit board are located at one end of the adjustor handle, and the motor and the motor frame are located at the other opposite end of the adjustor handle. A shaft aperture is formed in the adjustor handle, and the control circuit board is electrically connected to the motor by a wire extending through the shaft aperture.

In some embodiments, the beard trimmer further comprises an outer housing, the beard trimmer body further comprises an inner casing fixedly connected to the outer housing. The inner casing comprises a battery housing and a shaft housing, wherein the battery housing is fixedly connected to the shaft housing, the battery housing defining a battery receptacle sized to receive the battery, wherein the battery housing is located at the lower part of the shaft housing, which extends into the comb adjustment assembly.

In some embodiments, the shaft housing extends into the shaft aperture, a sealing ring fixture and a sealing ring are disposed in the shaft housing, the sealing ring fixture is integrally formed with the shaft housing, the sealing ring is hermetically connected in the sealing ring fixture, a wiring aperture through which a wire can pass is formed in the sealing ring, and the sealing ring is hermetically coupled to the wire.

In some embodiments, the beard trimmer further comprises an outer housing, the beard trimmer body and the comb adjustment assembly are disposed in the outer housing, the cutting assembly and the comb extend out of the outer housing. A front handle notch and a rear handle notch are formed in the outer housing, each of the front handle notch and the rear handle notch being aligned with a position of the adjustor handle to permit access to the adjustor handle through the front and rear handle notches.

In some embodiments, the beard trimmer body further comprises a battery housing located at a lower part of the adjustor handle, groove shaft is coupled to the battery housing, a spring is disposed between the groove shaft and the battery housing, and a groove is formed on the adjustor handle, wherein the groove engages with the groove shaft.

In some embodiments, the beard trimmer further comprises an outer housing defining two linkage apertures, two coupling arms are arranged at a lower part of the comb, and the coupling arms are detachably connected to the comb adjustment assembly via the linkage apertures.

In some embodiments, the comb adjustment assembly further comprises a second adjustment element. One end of the second adjustment element is connected with the first adjusting connector, and the other end of the second adjustment element is provided with a comb clip. A neck is coupled to the comb, the comb clip is clamped and connected in the neck, the first adjusting connector configured to drive the second adjustment element and the comb to move, and an included angle is formed between a moving direction of the first adjusting connector and an extending direction of the second adjustment element.

In some embodiments, the beard trimmer body comprises a motor coupled to a motor frame, the motor frame defining a guide groove, and the second adjustment element includes a guide edge positioned to engage within and slide along the guide groove.

In some embodiments, the adjustor handle is threadably coupled to the first adjusting connector, the first adjusting connector comprises an extension arm, a connector is coupled to the extension arm, and the extension arm is connected to the second adjustment element.

In some embodiments, the comb adjustment assembly further comprises a guide collar coupled to the beard trimmer body, a guide collar aperture is formed in the guide collar, and the extension arm extends through the guide collar aperture; the guide collar matches with the first adjusting connector to limit the rotation of the first adjusting connector, and when rotating the adjustor handle, the extension arm moves through the guide collar aperture.

In some embodiments, the adjustor handle comprises an outer cylinder concentric with and surrounding an inner cylinder, the outer cylinder being fixedly connected to the inner cylinder, and a ring groove is formed between the outer cylinder and the inner cylinder. The comb adjustment assembly further comprises a guide collar, which comprises a cylindrical housing configured to be disposed in the ring groove. A guide collar aperture is formed in an upper end of the cylindrical housing, and the first adjusting connector comprises the extension arm, wherein the extension arm is configured to extend through the guide collar aperture.

In some embodiments, the first adjusting connector comprises a threaded barrel, and the inner cylinder is threadably coupled to the threaded barrel. A spiral groove is formed on the inner cylinder, a spiral convex groove is formed on the first adjusting connector, the spiral groove is in meshing connection with the spiral convex groove, and a vertical distance from a starting point to an ending point of the spiral groove is 3-6 mm greater than a vertical distance from a starting point to an ending point of the spiral convex groove.

In some embodiments, a beard trimmer comprises a beard trimmer body, a cutting assembly coupled to the beard trimmer body, a comb, and a comb adjustment assembly coupled to the beard trimmer body and operably coupled to the comb to move the comb relative to the cutting assembly and control a distance between the comb and the cutting assembly. The comb adjustment assembly comprises a first adjusting connector coupled to the comb, and an adjustor handle operably coupled to the first adjusting connector, wherein rotation of the adjustor handle drives the first adjusting connector to translate along an axial direction of the adjustor handle, and the first adjusting connector drives the comb to move relative to the cutting assembly. The beard trimmer body further comprises an outer housing, and an inner casing disposed within and fixedly coupled to the outer housing, the inner casing including a battery housing defining a battery receptacle sized to receive a battery, and a shaft housing fixedly connected to the battery housing.

In some embodiments, the beard trimmer further comprises a sealing ring fixture disposed within and integrally formed with the shaft housing, and a sealing ring hermetically coupled to the sealing ring and defining a wiring aperture sized to hermetically engage an exterior of a wire.

In some embodiments, the battery housing and the shaft housing are integrally formed together.

The present disclosure has the following beneficial effects: after the comb adjustment assembly of the present disclosure is coupled to the beard trimmer body, the height of each comb unit can be subjected to stepless regulation, and the user may adjust the hair cutting length by accurately adjusting the extending length of each comb unit.

BRIEF DESCRIPTION OF THE DRAWINGS

The above and other objectives, features and advantages of the present disclosure will become more apparent by describing in more detail the preferred embodiments of the present disclosure shown in the drawings. The same numeral throughout the drawings represents the same part, and the drawings are not drawn by equal scaling of the actual size, with the emphasis on illustrating the tenet of the present disclosure.

DETAILED DESCRIPTION

Figure 1:
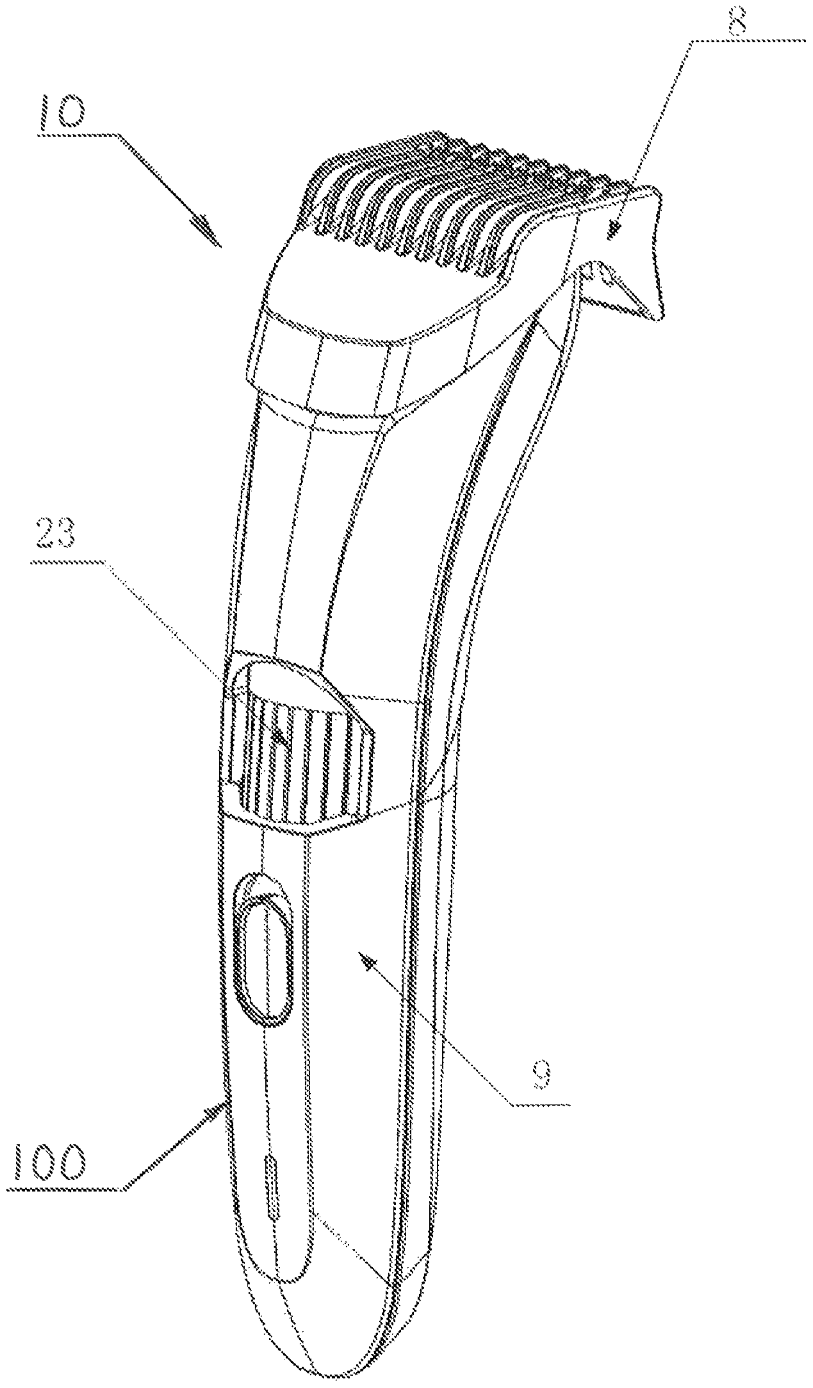
FIG. 1 is a perspective view of a beard trimmer according to the present disclosure.

In order to make the present disclosure convenient to understand, the present disclosure will be described more comprehensively below with reference to the related drawings.

It is to be noted that when one component is regarded to be "connected" or "coupled" to another component, this component may be directly connected or coupled to other component, combined integrally, or an intermediate component may be present between the specified components. In the present disclosure, terms, such as "install", "one end", "the other end" and similar expressions are only for the purpose of description.

Unless otherwise defined, all technical and scientific terms used herein have the same meanings as commonly understood by those skilled in the art. Herein, terms used in the description of the present disclosure are only for the purpose of describing specific embodiments and not intended to limit the present disclosure. Term "and/or" used herein includes one or any and all combinations of multiple related items which are listed.

Referring to FIG. 1-FIG. 17, a beard trimmer 10 according to the present disclosure is shown including a beard trimmer body 100, a cutting assembly 1, a comb 8, and a comb adjustment assembly 2. The comb adjustment assembly 2 and the cutting assembly 1 are coupled to the beard trimmer body 100, the comb 8 matches with the cutting assembly 1, and the comb adjustment assembly 2 is operably coupled to the comb 8 to move the comb 8 relative to the cutting assembly 1 and control a distance between the comb 8 and the cutting assembly 1, thereby permitting the beard trimmer 10 to cut hair with different lengths. The comb adjustment assembly 2 includes a first adjusting connector 22 and an adjustor handle 23, the adjustor handle 23 being in transmission connection with the first adjusting connector 22, and the first adjusting connector 22 is also in transmission connection with the comb 8. When rotated, the adjustor handle 23 drives the first adjusting connector 22 to translate along an axial direction of the adjustor handle 23, and the first adjusting connector 22 drives the comb 8 to move relative to the cutting assembly 1.

In a preferred embodiment, the comb adjustment assembly 2 includes a guide collar 21, the first adjusting connector 22 and the adjustor handle 23, and the adjustor handle 23 is threadably coupled to the first adjusting connector 22, such as by a screw connection. The first adjusting connector 22 includes the extension arm 222, and a connector 2221 which is used to connect with the external structure is coupled to the extension arm 222. A guide collar aperture 211 is formed in the guide collar 21, and the extension arm 222 extends through the guide collar aperture 211. When fixed, the guide collar 21 matches with the first adjusting connector 22 to limit the rotation of the first adjusting connector 22 and rotate the adjustor handle 23 around a first axial line A. The extension arm 222 moves through the guide collar aperture 211, namely, translates along the first axial line A. More specifically, the adjustor handle 23 is rotated, due to the effect of the guide collar aperture 211, the first adjusting connector 22 cannot realize rotation, therefore the first adjusting connector 22 can only move along the axial direction of the screw in relative to the adjustor handle 23, and the extension arm 222 fixedly connected to the first adjusting connector 222 can only move along the guide collar aperture 211.

Figure 14:
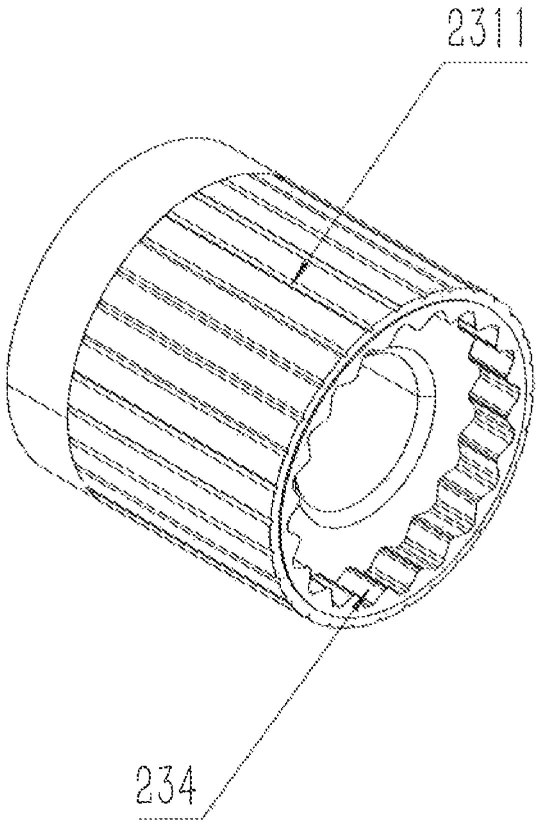
FIG. 14 is a perspective view of an adjustor handle usable in the beard trimmer of FIG. 1.
Figure 15:
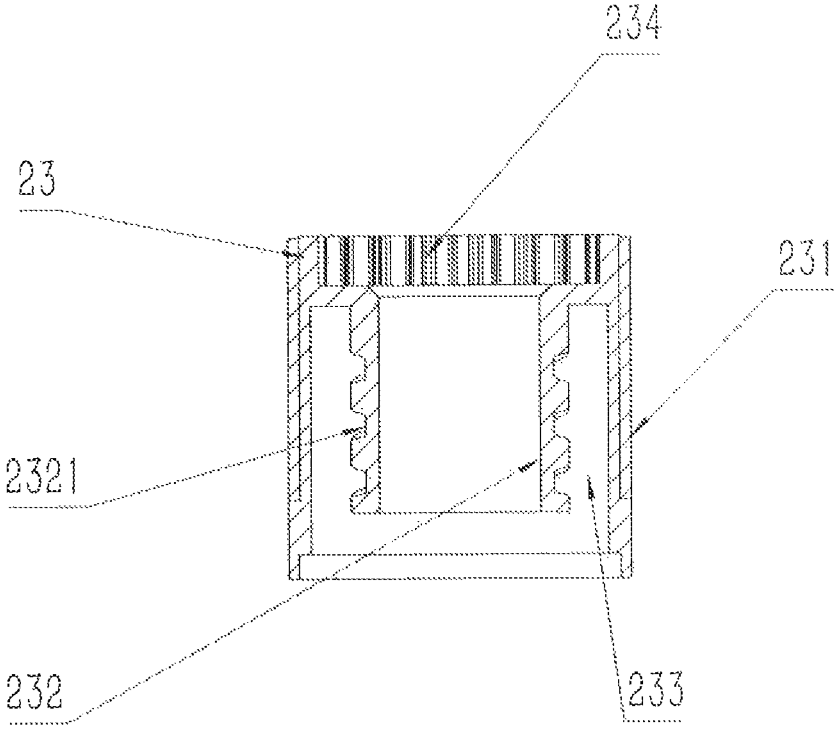
FIG. 15 is a side elevation view, in cross-section, of the adjustor handle of FIG. 14.

Referring to FIG. 14 and FIG. 15, in a preferred embodiment, the adjustor handle 23 includes an outer cylinder 231 concentric with and surrounding an inner cylinder 232, the outer cylinder 231 being fixedly connected to the inner cylinder 232, a ring groove 233 is formed between the outer cylinder 231 and the inner cylinder 232. The inner cylinder 232 is threadably coupled to the first adjusting connector 22. An operator rotates the outer cylinder 231 to drive the inner cylinder 232 to rotate along the outer cylinder 231. An anti-skid slot 2311 is formed on the surface of the adjustor handle 23, so that a user can rotate the adjustor handle 23 conveniently.

In a preferred embodiment, a spiral groove 2321 is formed on the inner cylinder 232, a spiral convex groove 221 is formed on the first adjusting connector 222, the spiral groove 2321 is threadably coupled to the spiral convex groove 221, and when rotating the outer cylinder 231, the inner cylinder 232 also rotates. Due to the effect of the guide collar 21, the first adjusting connector 22 can only translate along the axial line A. A vertical distance from a starting point to an ending point of the spiral groove 2321 is greater than a vertical distance from a starting point to an ending point of the spiral convex groove 221, to ensure that the spiral groove 2321 and the spiral convex groove 221 are kept in a meshed state during the entire range of travel. Further, the vertical distance from the starting point to the ending point of the spiral groove 2321 is at least 2 mm greater than a vertical distance from the starting point to the ending point of the spiral convex groove 221, preferably 3-6 mm. Specifically, the vertical distance from the starting point to the ending point of the spiral groove 2321 is 3 mm or 4 mm or 4.5 mm or 5 mm or 6 mm greater than a vertical distance from the starting point to the ending point of the spiral convex groove 221.

Figure 13:
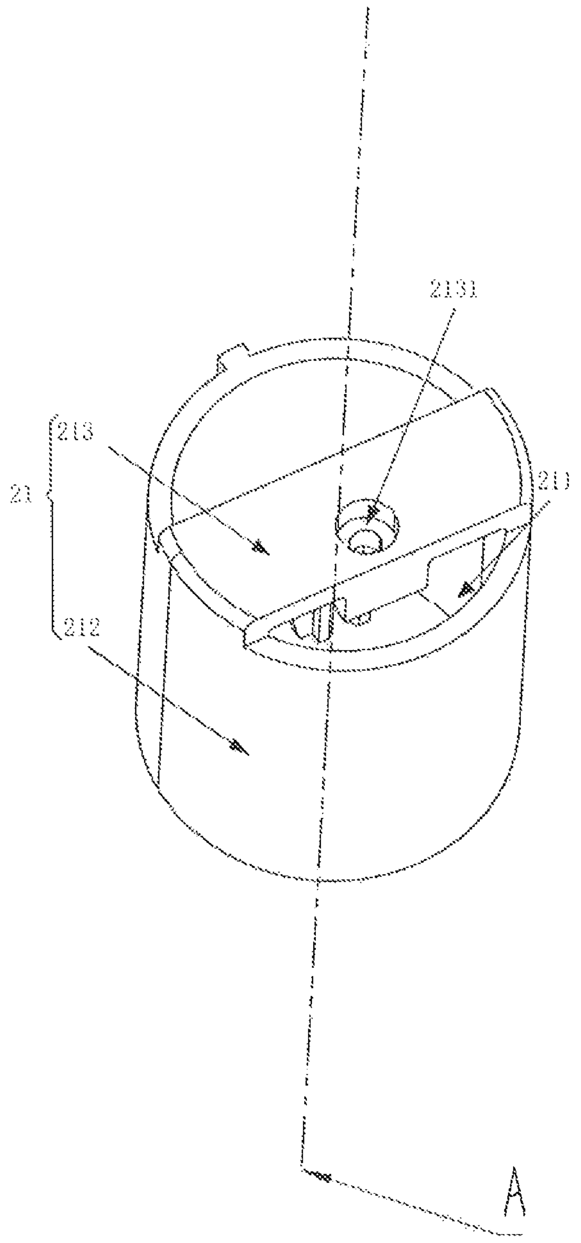
FIG. 13 is a perspective view of a guide collar usable in the beard trimmer of FIG. 1.

Referring to FIG. 13, in a preferred embodiment, the guide collar 21 includes a cylindrical housing 212, the cylindrical housing 212 is located in the outer cylinder 231, and the first adjusting connector 22 is located in the cylindrical housing 212. The upper part of the cylindrical housing 212 is fixedly connected with a connector 213, and the guide collar aperture 211 is located at one end of the cylindrical housing 212. A fixed hole 2131 is formed in the connector 213 of the guide collar 21. When being applied on the beard trimmer 10, the guide collar 21 is fixedly connected to the beard trimmer body 100 through a fixed screw, specifically, the guide collar 21 is fixedly connected to the inner casing 7 of the beard trimmer body 100.

Figure 12:
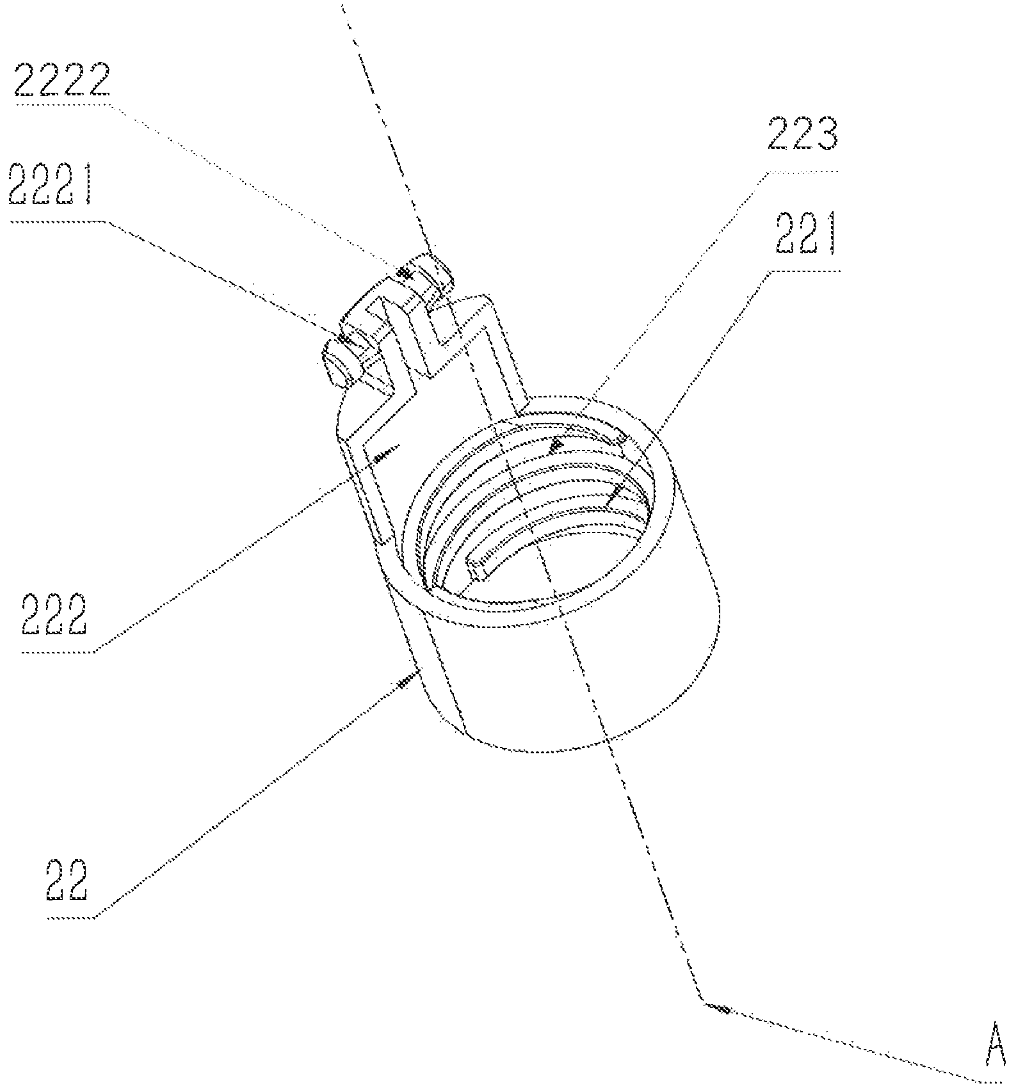
FIG. 12 is a perspective view of a first adjusting connector usable in the beard trimmer of FIG. 1.

Referring to FIG. 12, in a preferred embodiment, the first adjusting connector 22 includes a threaded barrel 223, which is threadably coupled to the inner cylinder 232, and the extension arm 222 is fixedly connected to the upper part of the threaded barrel 223. A clamping groove 2222 is formed on the connector 2221 and used to connect the comb 8, or directly connected to the comb 8, or indirectly connected to the comb 8.

Figure 4:
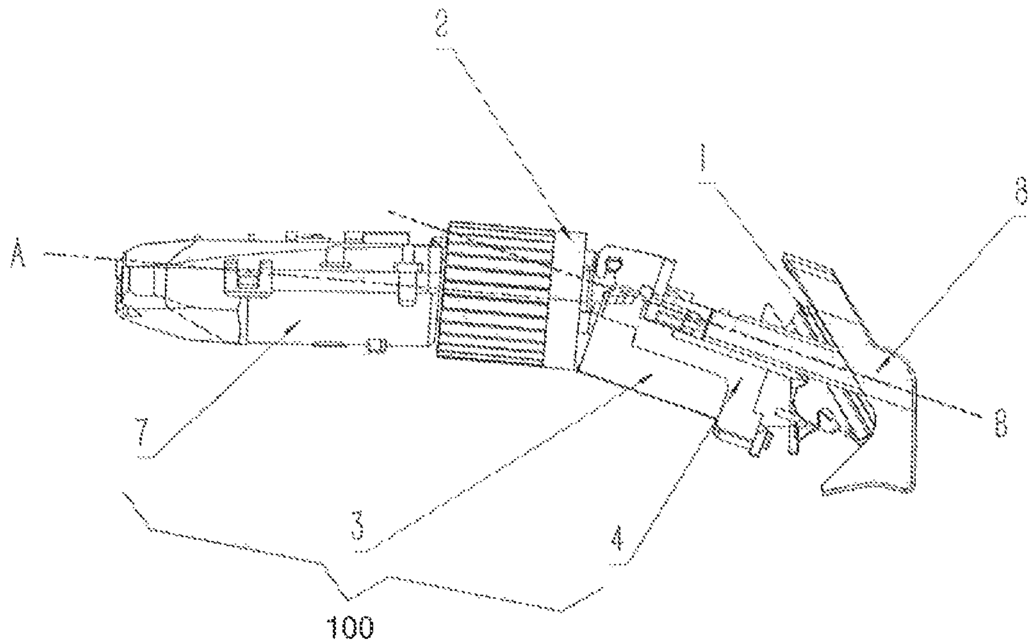
FIG. 4 is a side elevation view of the beard trimmer of FIG. 1, with some components removed for clarity.
Figure 5:
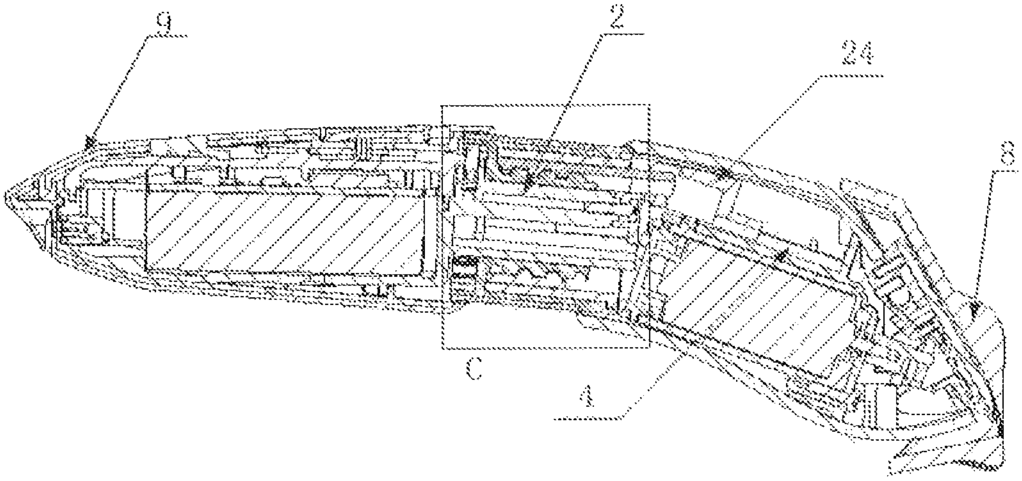
FIG. 5 is a side elevation view, in cross-section, of the beard trimmer of FIG. 1.
Figure 6:
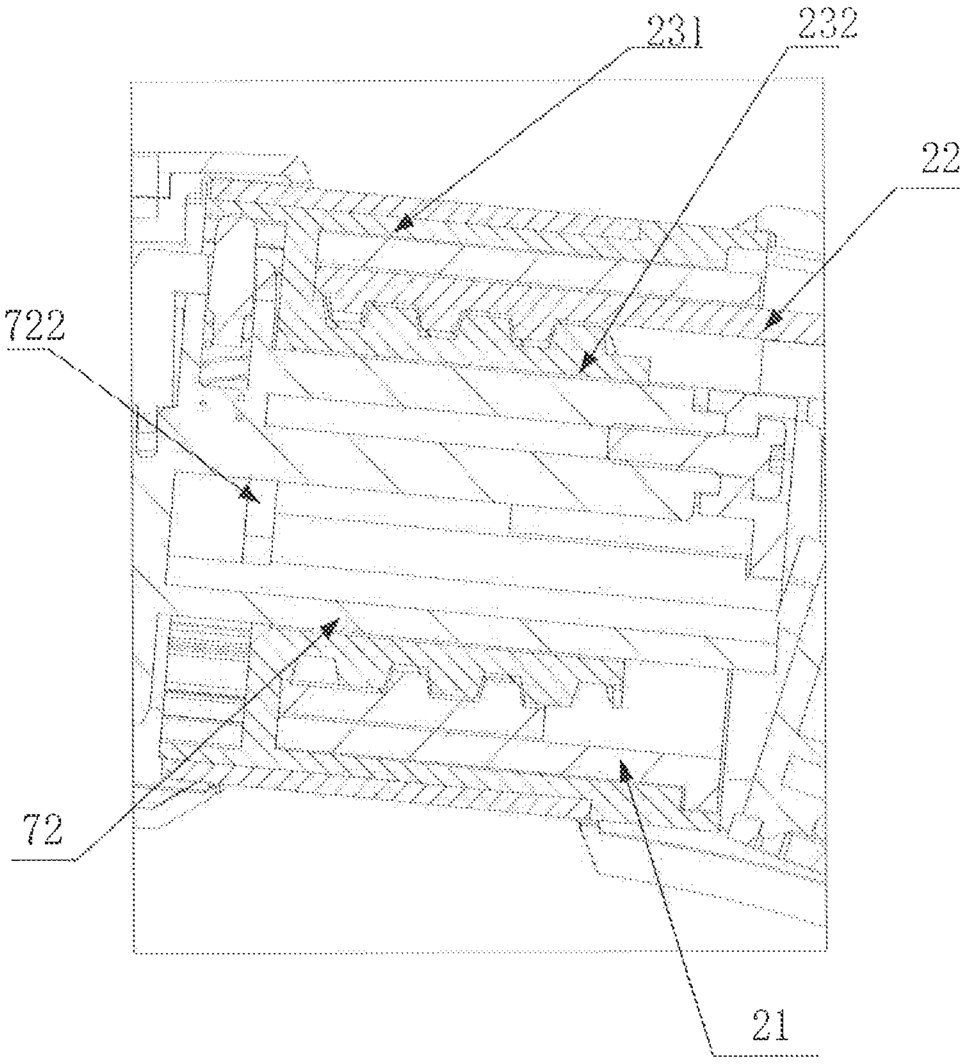
FIG. 6 is an enlarged view of detail C of FIG. 5.
Figure 7:
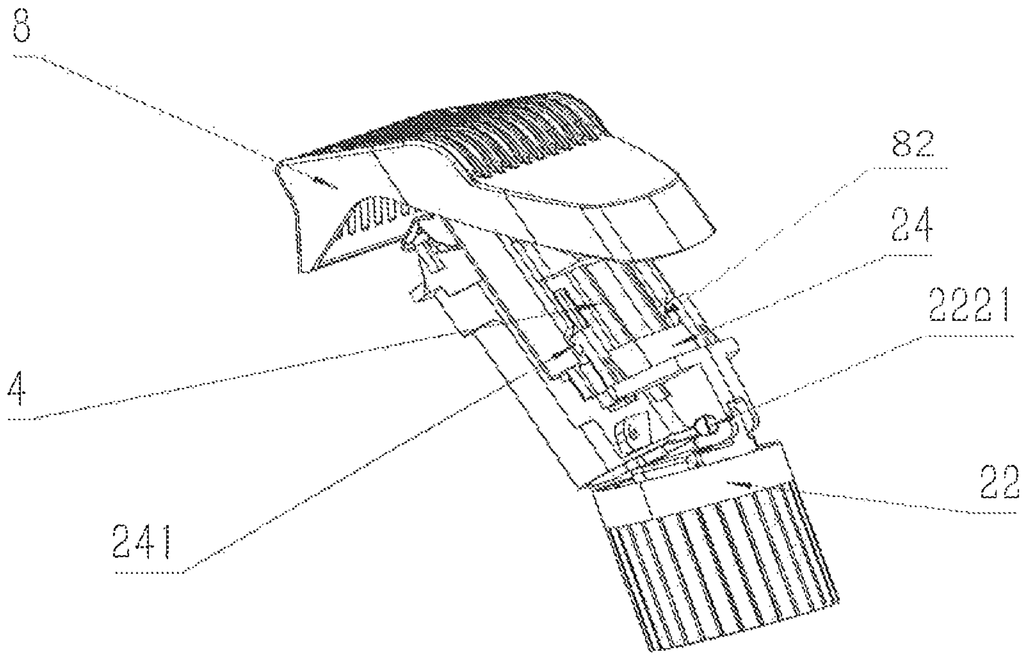
FIG. 7 is a perspective view of a top portion of the beard trimmer of FIG. 1.

Referring to FIG. 4 and FIG. 7, in a preferred embodiment, the extension arm 222 is connected to the second adjustment element 24, which is connected to the comb 8.

In a further preferred embodiment, a first end of the second adjustment element 24 is clamped with the extension arm 222, and an included angle is formed between an extending direction of the second adjustment element 24 and a moving direction of the first adjusting connector 22. A haircut knife of the beard trimmer 10 has a certain inclination, and the comb 8 also has a certain inclination matching with the haircut knife. Due to the arrangement of the second adjustment element 24, the comb 8 also has a certain inclination, and the distance between the comb 8 and the haircut knife is not affected to be adjusted. The first adjusting connector 22 is detachably connected to the second adjustment element 24. As a quick-wear part, the comb 8 is conveniently replaced. When the extension arm 222 of the comb adjustment assembly 2 moves through the guide collar aperture 211, the comb 8 may be driven to move, and the comb 8 moves along an axial line B, so as to realize the stepless regulation of the distance between the comb 8 and the haircut knife.

Figure 2:
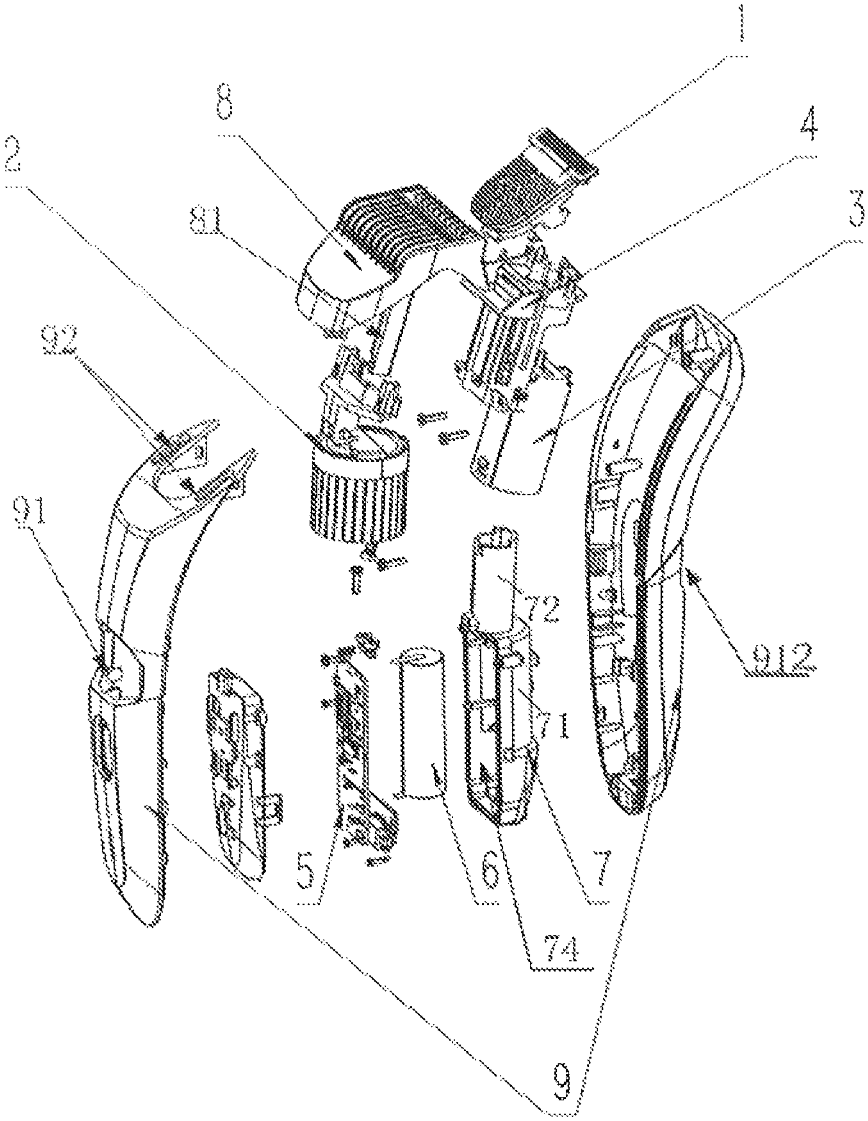
FIG. 2 is an exploded perspective view of the beard trimmer of FIG. 1.
Figure 3:
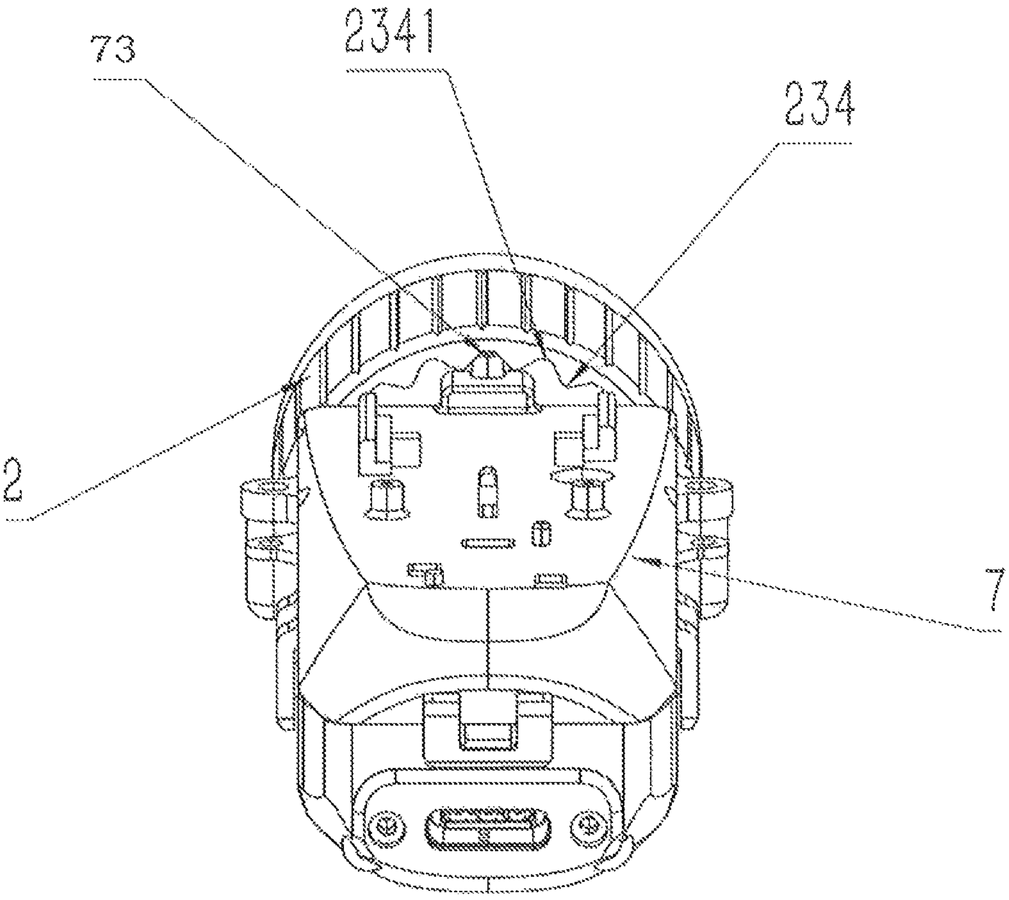
FIG. 3 is a top view of the beard trimmer of FIG. 1, with some components removed for clarity.

Referring to FIG. 2 and FIG. 7, in a preferred embodiment, the beard trimmer body 100 includes a motor 3 and a motor frame 4, the motor 3 is fixed on the motor frame 4, and the motor frame 4 is located at the upper part of the guide collar 21 (referring to the upper part in the using state, and the direction of the comb unit 8 is up).

Figure 8:
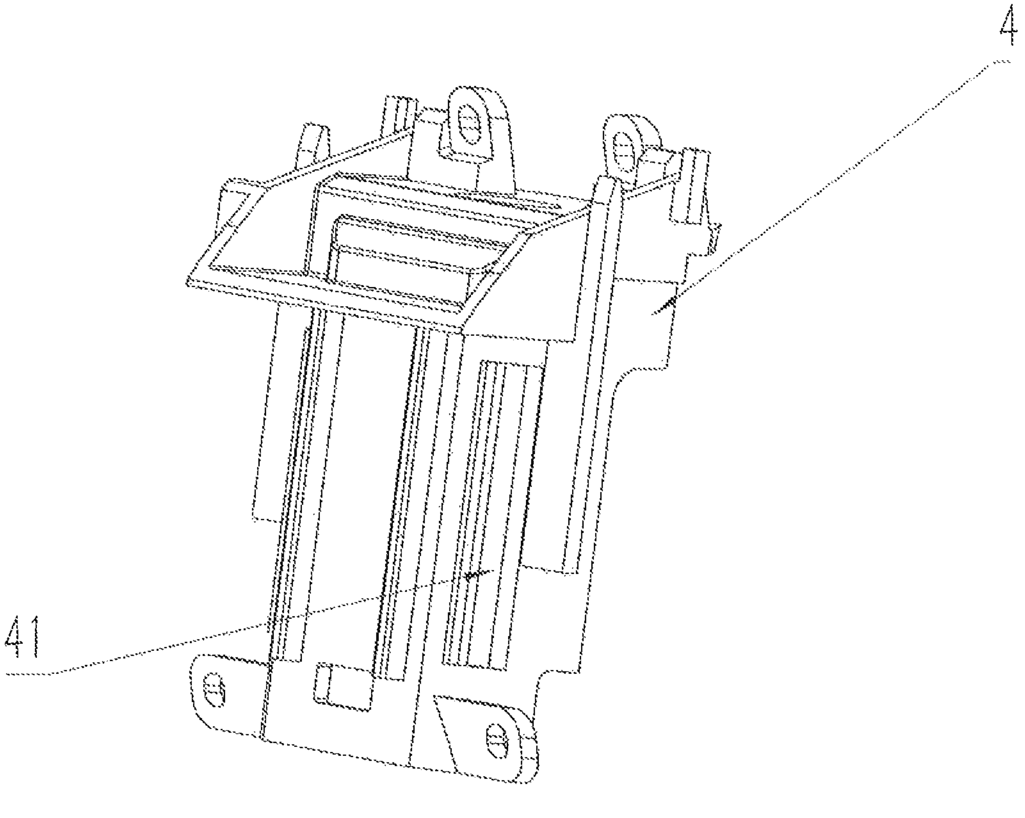
FIG. 8 is an enlarged view of a motor frame useable in the beard trimmer of FIG. 1.
Figure 9:
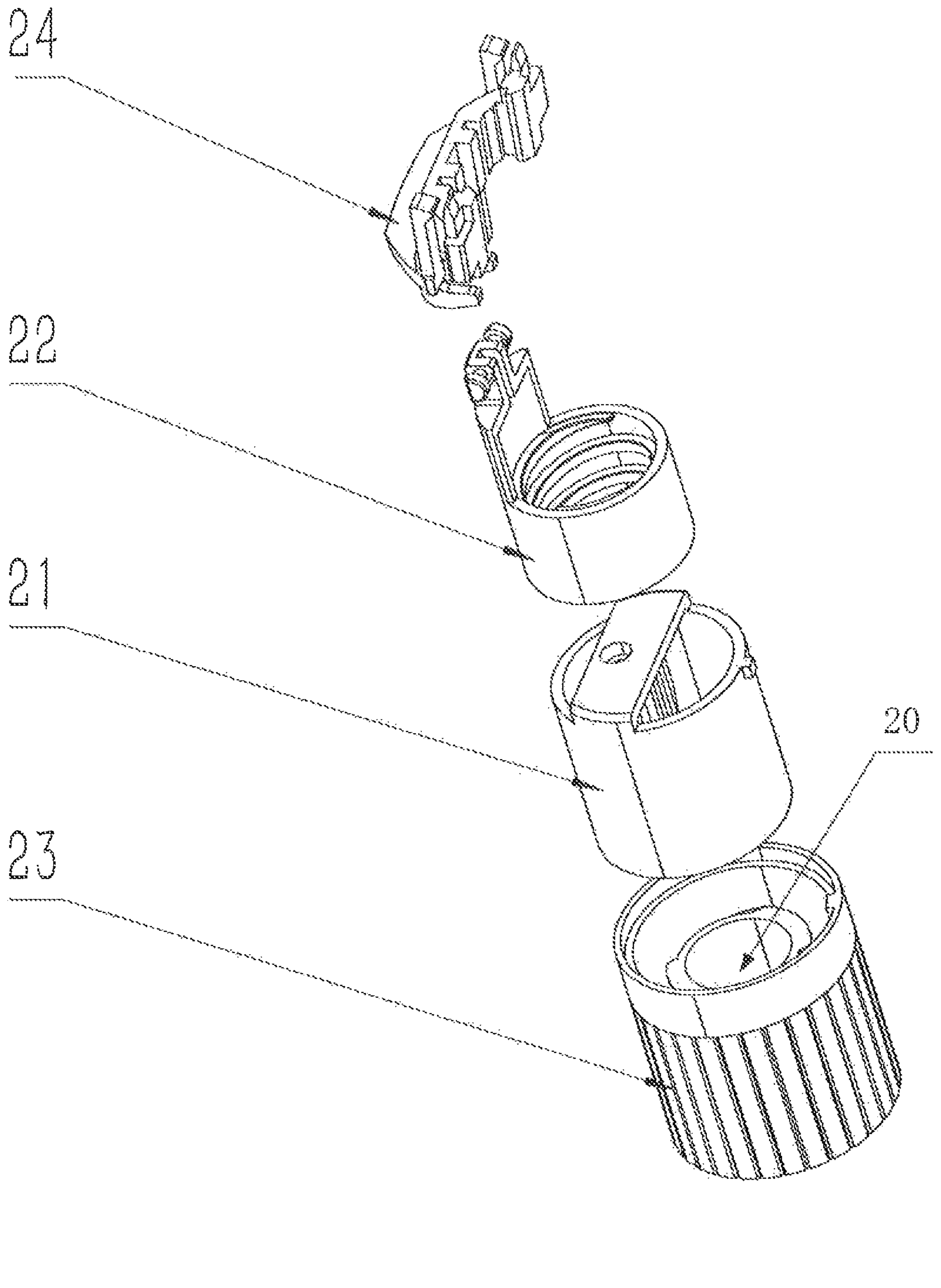
FIG. 9 is an exploded perspective view of a comb adjustment assembly and a second adjustment element usable in the beard trimmer of FIG. 1.
Figure 10:
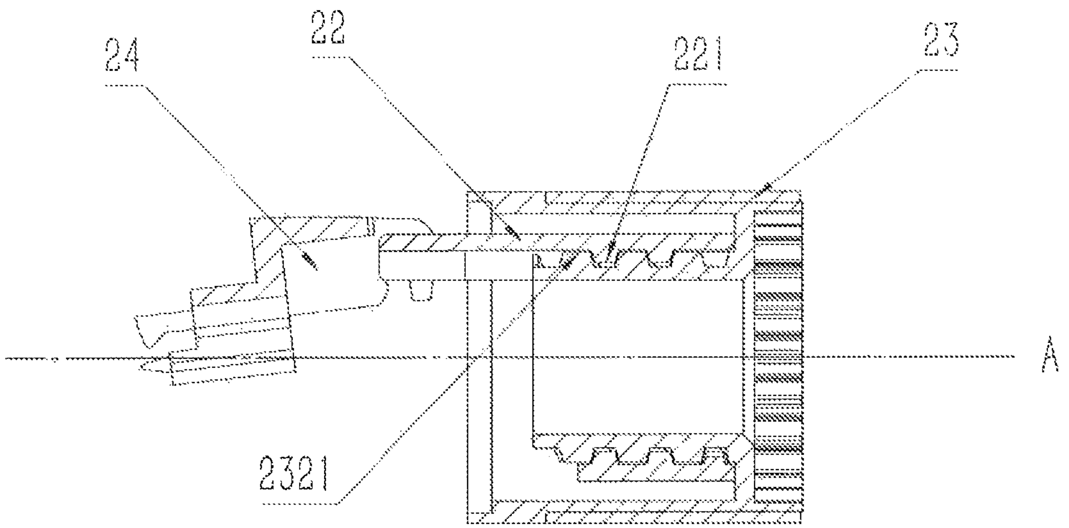
FIG. 10 is a side elevation view, in cross-section, of the comb adjustment assembly of FIG. 9.
Figure 11:
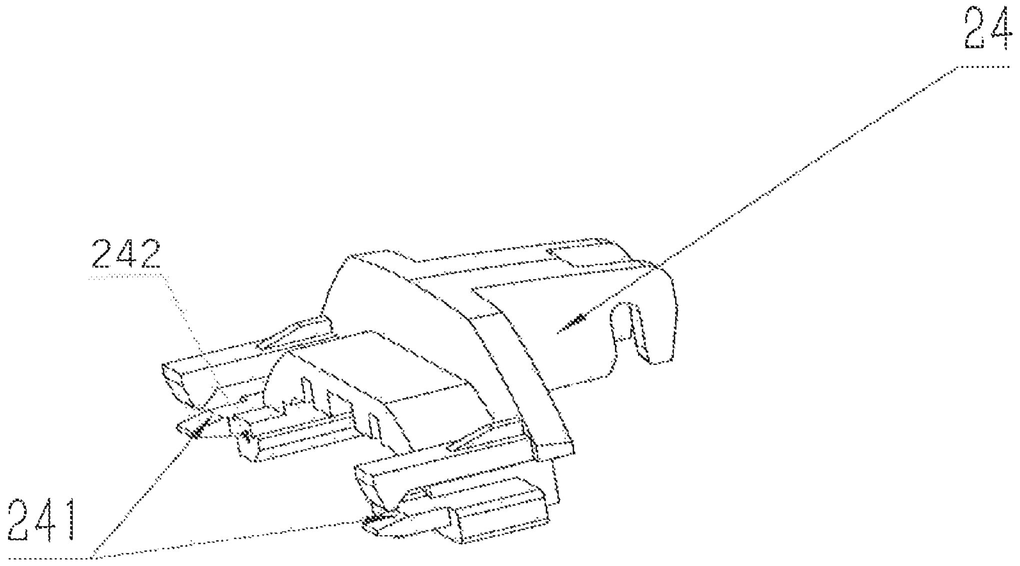
FIG. 11 is a perspective view of the second adjustment element of FIG. 9.

Referring to FIG. 8 and FIG. 11, in a further preferred embodiment, a guide groove 41 is formed on the motor frame 4, a guide edge 242 is coupled to the second adjustment element 24 and is positioned to engage within and slide along the guide groove 41, so that the second adjustment element 24 is in sliding connection with the motor frame 4. The second adjustment element 24 moves along an extending direction of the guide edge 242, so that the comb 8 has no great deviation during the moving process.

Referring to FIG. 7 and FIG. 13, in a further preferred embodiment, a fixed hole 2131 is formed in the guide collar 21, the fixed hole 2131 is a bolt hole, the guide collar 21 is fixed on the motor frame 4 through the bolt, specifically the fixed hole 2131 is located on the connector 213 of the guide collar 21. A comb clip 241 is coupled to the second adjustment element 24, a neck 82 is coupled to the comb unit 8, and the comb clip 241 is in clamping connection with the neck 82 in the using state.

Figure 16:
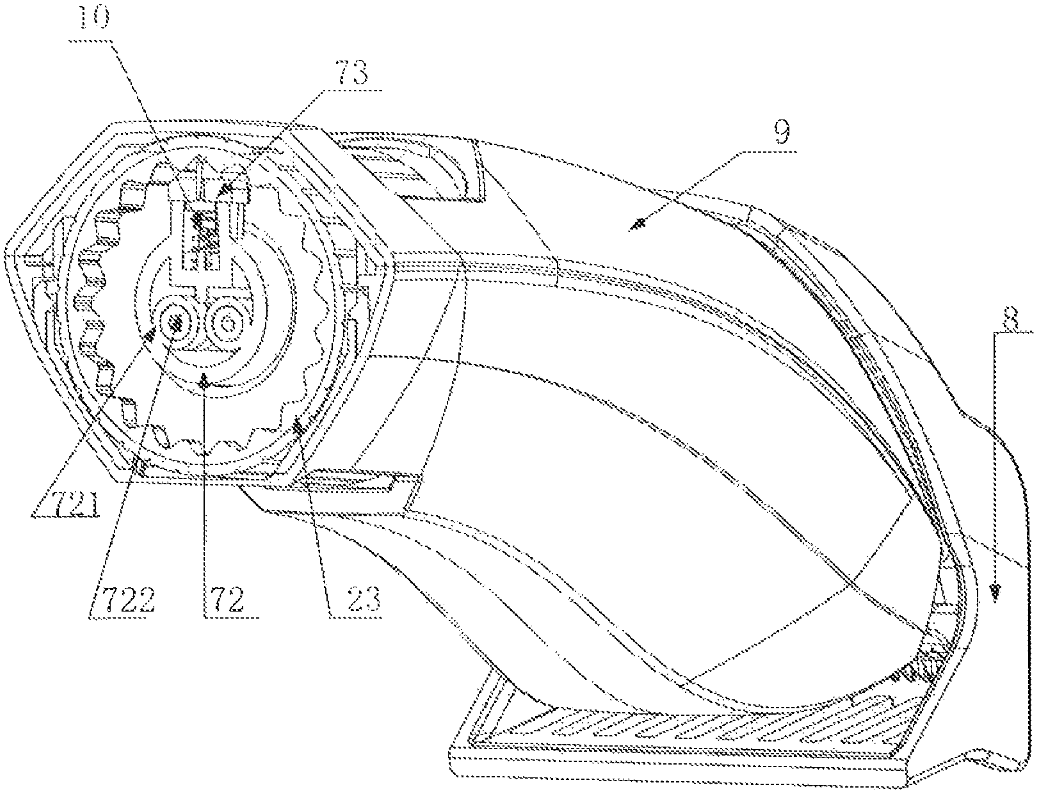
FIG. 16 is a perspective view of the beard trimmer of FIG. 1, with some components removed for clarity.
Figure 17:
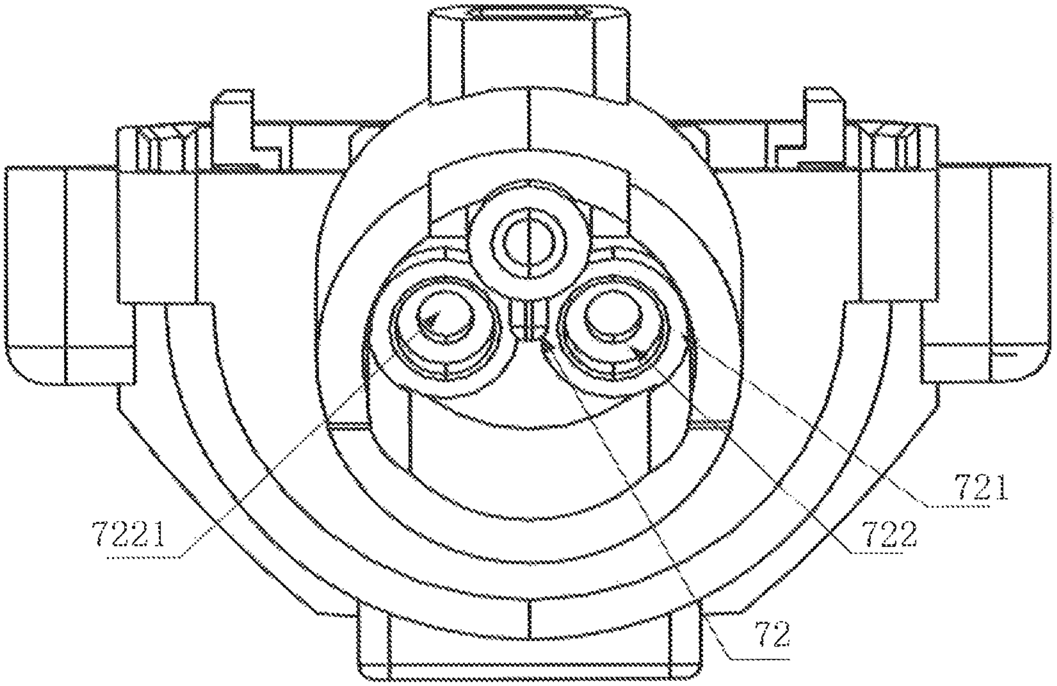
FIG. 17 is an end view of the beard trimmer of FIG. 1, with some components removed for clarity.

Referring to FIG. 14 and FIG. 16, in a further preferred embodiment, the beard trimmer body 100 further includes a battery housing 71, which is located at the lower part of the adjustor handle 23 (referring to the lower part in the using state, and the direction of the comb unit is up). A groove shaft 73 is arranged at the upper part of the inner casing 7, a spring 10 is disposed between the groove shaft 73 and the battery shell 7, a groove 234 is formed on the adjustor handle 23, the groove 234 matches with the groove shaft 73, a groove slot 2341 of each groove 234 is provided with a mark, which is used to mark the gear or the comb length, so that the user may visually observe the length from the comb unit 8 to the cutting assembly 1. Digital marks are uniformly arranged at the upper edge of the outer surface of the outer cylinder 231 of the adjustor handle 23, so when rotating the adjustor handle 23, the user can measure the position of the current comb unit 8 through the digital marks.

Referring to FIG. 2, in a preferred embodiment, the beard trimmer 10 further includes the cutting assembly 1, and the beard trimmer body 100 includes an outer housing 9. A control circuit board 5 and a battery 6 are housed within the beard trimmer body 100. The cutting assembly 1, the comb adjustment assembly 2, the motor 3, the motor frame 4, the control circuit board 5, the battery 6 and the inner casing 7 are disposed in the outer housing 9, a front handle notch 91 and a rear handle notch 912 are formed in the outer housing 9, each of the front handle notch 91 and the rear handle notch 912 being aligned with a position of the adjustor handle 23 to permit access to the adjustor handle 23 through the front and rear handle notches 91, 912. Accordingly, the adjustor handle 23 is partially exposed by the front and rear handle notches 91, 912, so that the user can regulate the position of the comb 8 conveniently. Two linkage apertures 92 are also formed in the outer housing 9, two coupling arms 81 are arranged at the lower part of the comb unit 8, and after extending through the linkage aperture 92, the coupling arms 81 are connected to the second adjustment element 24.

Referring to FIG. 2, in a preferred embodiment, the beard trimmer body 100 further includes a battery 6 and a control circuit board 5, the battery 6 is electrically connected to the control circuit board 5, the battery 6 and the control circuit board 5 are located at one end of the adjustor handle 23, and the motor 3 and the motor frame 4 are located at the other opposite end of the adjustor handle 23. A shaft aperture 20 is formed in the adjustor handle 23, and the control circuit board 5 is electrically connected to the motor 3 by a wire extending through the shaft aperture 20.

In a preferred embodiment, the beard trimmer 10 further includes an outer housing 9, the beard trimmer body 100 includes an inner casing 7, which is fixedly connected to the outer housing 9. The inner casing 7 includes a battery housing 71 and a shaft housing 72, which are connected fixedly. In some embodiments, the battery housing 71 and the shaft housing 72 are formed integrally to improve sealing. The battery housing 71 defines a battery receptacle 74, and the battery 6 is disposed in the battery receptacle 74, the battery housing 71 is located at the lower part of the shaft housing 72, the shaft housing 72 extends into the comb adjustment assembly 2, and the shaft housing 72 is located in the shaft aperture 20.

In a further preferred embodiment, the shaft housing 72 extends into the shaft aperture 20, a sealing ring fixture 721 and a sealing ring 722 are disposed in the shaft housing 72, the sealing ring fixture 721 and the shaft housing 72 are formed integrally, the sealing ring 722 is hermetically connected in the sealing ring fixture 721, a wiring aperture 7221 is formed in the sealing ring 722, a wire in the sealing ring 722 threads through the wiring aperture 7221, the sealing ring 722 is hermetically connected to the wire, and the waterproof effect is better.

The present disclosure has the following beneficial effects:

after the comb adjustment assembly 2 of the present disclosure is coupled to the beard trimmer 10, the height of each comb unit 8 can be subjected to stepless regulation, and the user may adjust the hair cutting length by accurately adjusting the extending length of each comb unit 8.

In this application, unless specific regulation and limitation otherwise, the first feature "onto" or "under" the second feature may include the direct contact of the first feature and the second feature, or indirect contact of the first feature and the second feature through an intermediation. Moreover, the first feature "onto", "above" and "on" the second feature may be that the first feature is right above and obliquely above the second feature, or merely indicates that the horizontal height of the first feature is higher than the second feature. The first feature "under", "below" and "down" the second feature may be that the first feature is right below and obliquely below the second feature, or merely indicates that the horizontal height of the first feature is less than the second feature.

In the description of the specification, the descriptions of reference terms "preferred embodiment", "another embodiment", "other embodiments" or "specific embodiment" and the like intend to be included in at least one embodiment or example of this application in combination with the specific characteristics, structures, materials or characteristics of this embodiment or example. In this specification, the schematic expression of the above terms does not need for the same embodiment or example. Moreover, the described specific characteristics, structures, materials or characteristics may be combined in one or more embodiments or examples in a suitable manner. In addition, without conflicting, those skilled in the art may combine and assemble different embodiments or examples and the characteristics of the different embodiments or examples.

Although the embodiments of this application have been shown and described above, it is understood that the above embodiments are exemplary instead of being understood as a limitation to this application. Those of ordinary skill in the art may make change, modification, replacement and deformation to the above embodiments within the scope of this application.

What is claimed is:

1. A beard trimmer, comprising a beard trimmer body, a cutting assembly, a comb, and a comb adjustment assembly, the comb adjustment assembly and the cutting assembly are coupled to the beard trimmer body, the comb matches with the cutting assembly, and the comb adjustment assembly is operably coupled to the comb to move the comb relative to the cutting assembly and control a distance between the comb and the cutting assembly; the comb adjustment assembly comprising a first adjusting connector and an adjustor handle, the adjustor handle being in transmission connection with the first adjusting connector, and the first adjusting connector is in transmission connection with the comb; and when rotating, the adjustor handle drives the first adjusting connector to translate along an axial direction of the adjustor handle, and the first adjusting connector drives the comb to move relative to the cutting assembly;

wherein the comb adjustment assembly further comprises a second adjustment element, one end of the second adjustment element is connected with the first adjusting connector, and the other end of the second adjustment element is provided with a comb clip; a neck is coupled to the comb, the comb clip is clamped and connected in the neck, the first adjusting connector configured to drive the second adjustment element and the comb to move, and an included angle is formed between a moving direction of the first adjusting connector and an extending direction of the second adjustment element;

the beard trimmer body comprises a motor coupled to a motor frame, the motor frame defining a guide groove; and the second adjustment element includes a guide edge positioned to engage within and slide along the guide groove.

2. The beard trimmer of claim 1, wherein the beard trimmer body comprises a motor and a motor frame, the motor is fixed on the motor frame, and the cutting assembly and the comb are located at one end of the motor frame facing away from the adjustor handle; the motor is operably coupled to the cutting assembly to drive the cutting assembly for cutting, the beard trimmer body further comprises a battery and a control circuit board, the battery is electrically connected to the control circuit board, the battery and the control circuit board are located at one end of the adjustor handle, and the motor and the motor frame are located at the other opposite end of the adjustor handle; and a shaft aperture is formed in the adjustor handle, and the control circuit board is electrically connected to the motor by a wire extending through the shaft aperture.

3. The beard trimmer of claim 2, wherein:

the beard trimmer further comprises an outer housing;

the beard trimmer body further comprises an inner casing fixedly connected to the outer housing; and the inner casing comprises a battery housing and a shaft housing, wherein the battery housing is fixedly connected to the shaft housing, the battery housing defining a battery receptacle sized to receive the battery; and wherein the battery housing is located at the lower part of the shaft housing, which extends into the comb adjustment assembly.

4. The beard trimmer of claim 3, wherein the shaft housing extends into the shaft aperture, a sealing ring fixture and a sealing ring are disposed in the shaft housing, the sealing ring fixture is integrally formed with the shaft housing, the sealing ring is hermetically connected in the sealing ring fixture, a wiring aperture through which a wire can pass is formed in the sealing ring, and the sealing ring is hermetically coupled to the wire.

5. The beard trimmer of claim 1, wherein the beard trimmer further comprises:

an outer housing;

the beard trimmer body and the comb adjustment assembly are disposed in the outer housing, the cutting assembly and the comb extend out of the outer housing;

a front handle notch and a rear handle notch are formed in the outer housing, each of the front handle notch and the rear handle notch being aligned with a position of the adjustor handle to permit access to the adjustor handle through the front and rear handle notches.

6. The beard trimmer of claim 1, wherein:

the beard trimmer body further comprises a battery housing located at a lower part of the adjustor handle;

a groove shaft is coupled to the battery housing;

a spring is disposed between the groove shaft and the battery housing, and a groove is formed on the adjustor handle, wherein the groove engages with the groove shaft.

7. The beard trimmer according to claim 1, wherein the beard trimmer further comprises an outer housing defining two linkage apertures, two coupling arms are arranged at a lower part of the comb, and the coupling arms are detachably connected to the comb adjustment assembly via the linkage apertures.

8. The beard trimmer of claim 1, wherein the adjustor handle is threadably coupled to the first adjusting connector, the first adjusting connector comprises an extension arm, a connector is coupled to the extension arm, and the extension arm is connected to the second adjustment element.

9. The beard trimmer of claim 8, wherein the comb adjustment assembly further comprises a guide collar coupled to the beard trimmer body, a guide collar aperture is formed in the guide collar, and the extension arm extends through the guide collar aperture; the guide collar matches with the first adjusting connector to limit the rotation of the first adjusting connector, and when rotating the adjustor handle, the extension arm moves through the guide collar aperture.

10. The beard trimmer of claim 1, wherein the adjustor handle comprises an outer cylinder concentric with and surrounding an inner cylinder, the outer cylinder being fixedly connected to the inner cylinder, a ring groove is formed between the outer cylinder and the inner cylinder; the comb adjustment assembly further comprises a guide collar, which comprises a cylindrical housing configured to be disposed in the ring groove, a guide collar aperture is formed in an upper end of the cylindrical housing, and the first adjusting connector comprises an extension arm, wherein the extension arm is configured to extend through the guide collar aperture.

11. The beard trimmer of claim 10, wherein the first adjusting connector comprises a threaded barrel, and the inner cylinder is threadably coupled to the threaded barrel; a spiral groove is formed on the inner cylinder, a spiral convex groove is formed on the first adjusting connector, the spiral groove is in meshing connection with the spiral convex groove, and a vertical distance from a starting point to an ending point of the spiral groove is 3-6 mm greater than a vertical distance from a starting point to an ending point of the spiral convex groove.

12. A beard trimmer, comprising:

a beard trimmer body;

a cutting assembly coupled to the beard trimmer body;

a comb;

a comb adjustment assembly coupled to the beard trimmer body and operably coupled to the comb to move the comb relative to the cutting assembly and control a distance between the comb and the cutting assembly, the comb adjustment assembly comprising:

a first adjusting connector coupled to the comb; and an adjustor handle operably coupled to the first adjusting connector, wherein rotation of the adjustor handle drives the first adjusting connector to translate along an axial direction of the adjustor handle, and the first adjusting connector drives the comb to move relative to the cutting assembly;

wherein the beard trimmer body further comprises:

an outer housing; and an inner casing disposed within and fixedly coupled to the outer housing, the inner casing including a battery housing defining a battery receptacle sized to receive a battery, and a shaft housing fixedly connected to the battery housing: wherein the battery housing is fixedly connected to the shaft housing, the battery housing defining a battery receptacle sized to receive the battery; and wherein the battery housing is located at the lower part of the shaft housing, which extends into the comb adjustment assembly;

wherein the beard trimmer body further comprises a motor and a motor frame, the motor is fixed on the motor frame, and the cutting assembly and the comb are located at one end of the motor frame facing away from the adjustor handle; the motor is operably coupled to the cutting assembly to drive the cutting assembly for cutting, the beard trimmer body further comprises a battery and a control circuit board, the battery is electrically connected to the control circuit board, the battery and the control circuit board are located at one end of the adjustor handle, and the motor and the motor frame are located at the other opposite end of the adjustor handle; and a shaft aperture is formed in the adjustor handle, and the control circuit board is electrically connected to the motor by a wire extending through the shaft aperture; and wherein the shaft housing extends into a shaft aperture formed in the adjustor handle, a sealing ring fixture and a sealing ring are disposed in the shaft housing, the sealing ring fixture is integrally formed with the shaft housing, the sealing ring is hermetically connected in the sealing ring fixture, a wiring aperture through which a wire can pass is formed in the sealing ring, and the sealing ring is hermetically coupled to the wire.

13. The beard trimmer of claim 12, in which the battery housing and the shaft housing are integrally formed together.

14. A beard trimmer, comprising a beard trimmer body, a cutting assembly, a comb, and a comb adjustment assembly, the comb adjustment assembly and the cutting assembly are coupled to the beard trimmer body, the comb matches with the cutting assembly, and the comb adjustment assembly is operably coupled to the comb to move the comb relative to the cutting assembly and control a distance between the comb and the cutting assembly; the comb adjustment assembly comprising a first adjusting connector and an adjustor handle, the adjustor handle being in transmission connection with the first adjusting connector, and the first adjusting connector is in transmission connection with the comb; and when rotating, the adjustor handle drives the first adjusting connector to translate along an axial direction of the adjustor handle, and the first adjusting connector drives the comb to move relative to the cutting assembly;

wherein the adjustor handle comprises an outer cylinder concentric with and surrounding an inner cylinder, the outer cylinder being fixedly connected to the inner cylinder, a ring groove is formed between the outer cylinder and the inner cylinder; the comb adjustment assembly further comprises a guide collar, which comprises a cylindrical housing configured to be disposed in the ring groove, a guide collar aperture is formed in an upper end of the cylindrical housing, and the first adjusting connector comprises an extension arm, wherein the extension arm is configured to extend through the guide collar aperture; and wherein the first adjusting connector comprises a threaded barrel, and the inner cylinder is threadably coupled to the threaded barrel; a spiral groove is formed on the inner cylinder, a spiral convex groove is formed on the first adjusting connector, the spiral groove is in meshing connection with the spiral convex groove, and a vertical distance from a starting point to an ending point of the spiral groove is 3-6 mm greater than a vertical distance from a starting point to an ending point of the spiral convex groove.

* * * * *